(12) United States Patent
Kim et al.

(10) Patent No.: US 9,240,132 B2
(45) Date of Patent: Jan. 19, 2016

(54) NANOPHOSPHOR SHEET AND BACKLIGHT DEVICE

(71) Applicant: Samsung Display Co., Ltd., Yongin, Gyeonggi-Do (KR)

(72) Inventors: Dong Hoon Kim, Suwon-si (KR); Hyun-Hwa Song, Suwon-si (KR); Seung Hwan Chung, Asan-si (KR); Young Jun Choi, Yongin-si (KR); Byung Choon Yang, Seoul (KR); Han Moe Cha, Anyang-si (KR)

(73) Assignee: Samsung Display Co., Ltd. (KR)

( * ) Notice: Subject to any disclaimer, the term of this patent is extended or adjusted under 35 U.S.C. 154(b) by 304 days.

(21) Appl. No.: 13/760,835

(22) Filed: Feb. 6, 2013

(65) Prior Publication Data

US 2014/0056024 A1 Feb. 27, 2014

(30) Foreign Application Priority Data

Aug. 23, 2012 (KR) .................. 10-2012-0092429

(51) Int. Cl.
*F21V 7/04* (2006.01)
*G09F 13/04* (2006.01)
*G02F 1/1335* (2006.01)
(Continued)

(52) U.S. Cl.
CPC . *G09F 13/04* (2013.01); *B32B 5/16* (2013.01); *G02B 6/003* (2013.01); *G02B 6/0035* (2013.01); *G02F 1/1336* (2013.01); *G02B 6/0041* (2013.01); *G02B 6/0051* (2013.01); *G02F 2001/133614* (2013.01); *G02F 2202/36* (2013.01); *Y10T 428/25* (2015.01)

(58) Field of Classification Search
CPC .................. G02B 6/0063; G02F 2001/133614; G02F 2202/36; G09F 13/00
USPC .................. 362/608, 231, 84; 349/61, 62, 124
See application file for complete search history.

(56) References Cited

U.S. PATENT DOCUMENTS 8,035,772 B2 10/2011 Kim et al.
8,866,992 B2 * 10/2014 Kim et al. ........................ 349/61
8,867,117 B2 * 10/2014 Gibson et al. ................. 359/267
(Continued)

FOREIGN PATENT DOCUMENTS

CN 1919965 A 2/2007
CN 201437941 U 4/2010
(Continued)

OTHER PUBLICATIONS

European Search Report corresponding to European Patent Application No. 13154330.8.
(Continued)

*Primary Examiner* — Ali Alavi
(74) *Attorney, Agent, or Firm* — Innovation Counsel LLP (57) ABSTRACT

A nanophosphor sheet is presented. The nanophosphor sheet may include a base layer, a plurality of core-shell phosphors dispersed in the base layer, and a coating layer surrounding at least one core-shell phosphor among the plurality of core-shell phosphors. Also presented is a backlight device that includes a light source emitting light, a light guide plate receiving the light, and a plurality of core-shell phosphors positioned to receive the light and convert the light to white light. The core-shell phosphors may be incorporated into the light guide plate or be positioned on the light guide plate as a separate layer.

32 Claims, 8 Drawing Sheets (51) Int. Cl.
*B32B 5/16* (2006.01)
*F21V 8/00* (2006.01)

(56) References Cited

U.S. PATENT DOCUMENTS

| | | | |
|---|---|---|---|
| 8,884,511 B2* | 11/2014 | Gibson et al. | 313/503 |
| 8,902,379 B2* | 12/2014 | Park | 349/62 |
| 2006/0103589 A1 | 5/2006 | Chua et al. | |
| 2007/0148332 A1* | 6/2007 | Lee et al. | 427/66 |
| 2008/0136314 A1* | 6/2008 | Brown et al. | 313/503 |
| 2010/0110728 A1 | 5/2010 | Dubrow et al. | |
| 2010/0247866 A1 | 9/2010 | Nakahata et al. | |
| 2012/0075837 A1* | 3/2012 | Um | 362/84 |

FOREIGN PATENT DOCUMENTS

| | | |
|---|---|---|
| WO | 2011/092647 A2 | 8/2011 |
| WO | 2012-023679 | 2/2012 |

OTHER PUBLICATIONS

Ziegler et al: Silica-Coated InP/ZnS Nanocrystals as Converter Material in White LEDs:' Advanced Materials, Wiley-V C H Verlag GMBH & CO. KGAA, DE, vol. 20, No. 21, Nov. 2008, pp. 4068-4073.

Rogach et al: "Raisin Bun-Type Composite Spheres of Silica and Semiconductor Nanocrystals", Chemistry of Materials, American Chemical Society, US, vol. 12, No. 9, Aug. 31, 2000, pp. 2676-2685.

* cited by examiner

NANOPHOSPHOR SHEET AND BACKLIGHT DEVICE

CROSS-REFERENCE TO RELATED APPLICATION

This application claims priority to and the benefit of Korean Patent Application No. 10-2012-0092429 filed in the Korean Intellectual Property Office on Aug. 23, 2012, the entire contents of which are incorporated herein by reference.

BACKGROUND OF THE INVENTION (a) Field of the Invention

The present invention relates to a nanophosphor sheet and a backlight device.

(b) Description of the Related Art

Display devices are classified into emissive display devices that emit light on their own to illuminate an image and non-emissive display devices that use light from a separate light source to display an image. An example of non-emissive display devices is liquid crystal display.

Liquid crystal display is currently one of the most widely used flat panel displays, and includes two display panels on which field generating electrodes such as a pixel electrode and a common electrode are formed, a liquid crystal layer interposed therebetween, and a backlight device providing light to the display panels holding the liquid crystal layer. A liquid crystal display displays an image by applying a voltage to the field generating electrode to generate an electric field on the liquid crystal layer, determining the direction of liquid crystal molecules of the liquid crystal layer therethrough, and controlling the magnitude of light provided by the backlight device. A typically backlight device includes a light source emitting light, a light guide plate dispersing light emitted from the light source to convert light into a planar light source, various kinds of diffusion films, and the like.

Cold cathode fluorescent lamp (CCFL), external electrode fluorescent lamp (EEFL), and light emitting diode (LED) are some of the light sources that have been used for the backlight device.

A liquid crystal display adopting a color filter may generate white light by mixing blue light emitted from a light emitting diode (LED) chip and yellow light absorbing a portion of blue light to perform excitation and emission. In this case, a yellow phosphor is formed in a dispersion state in a sealing layer applied on a chip to display yellow light.

However, there is a problem in that degradation of the phosphor occurs due to heat generated in the light emitting diode (LED).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a nanophosphor sheet and a backlight device preventing degradation.

An exemplary embodiment of the present invention provides a nanophosphor sheet including: a base layer, a core-shell phosphor dispersed in the base layer, and a coating layer surrounding the core-shell phosphor.

Where there is a plurality of core-shell phosphors dispersed in the base layer, the coating layer may surround two or more core-shell phosphors.

The coating layer may include at least one of silica, polystyrene, and urethane.

The nanophosphor sheet may further include: a substrate member on at least one surface of both surfaces of the base layer, wherein the substrate member may include at least one of a polyethylene terephthalate film (PET film), and a copolymer of polycarbonate (PC) and polyethylene terephthalate (CoPET).

The nanophosphor sheet may further include: a matte layer that is subjected to matte treatment on the substrate member.

The core-shell phosphor may be formed of at least one of CdSe/ZnS, InP/ZnS, ZnS:Mn/ZnS, PbSe/PbS, CdSe/CdS, CdTe/CdS, and CdTe/ZnS.

The base layer may be formed of at least one of a silicon resin and a urethane resin.

Another exemplary embodiment of the present invention provides a backlight device including: a light source emitting light, a light guide plate receiving and guiding the light, and a nanophosphor sheet positioned on the light guide plate and converting the light into white light, wherein the nanophosphor sheet includes a base layer, and a plurality of core-shell phosphors dispersed in the base layer.

The backlight device may include: a coating layer surrounding at least one core-shell phosphor among the plurality of core-shell phosphors.

The coating layer may surround two or more core-shell phosphor groups among the plurality of core-shell phosphors.

The coating layer may include at least one of silica, polystyrene, and urethane.

The nanophosphor sheet may further include: a substrate member on at least one surface of both surfaces of the base layer, wherein the substrate member may include at least one of a polyethylene terephthalate film (PET film), and a copolymer of polycarbonate (PC) and polyethylene terephthalate (CoPET).

The nanophosphor sheet may further include: a matte layer that is subjected to matte treatment on the substrate member.

The backlight device may further include: barrier layers positioned on both surfaces of the base layer.

The barrier layer may be formed of a metal material including at least one of silicon oxide or aluminum and silver.

The nanophosphor sheet may further include: a substrate member on at least one surface of both surfaces of the base layer, wherein the substrate member may include at least one of a polyethylene terephthalate film (PET film), and a copolymer of polycarbonate (PC) and polyethylene terephthalate (CoPET).

The nanophosphor sheet may further include: a matte layer that is subjected to matte treatment on the substrate member.

The core-shell phosphor may be formed of any one of CdSe/ZnS, InP/ZnS, ZnS:Mn/ZnS, PbSe/PbS, CdSe/CdS, CdTe/CdS, and CdTe/ZnS.

The backlight device may further include: an optical film including a diffuser sheet positioned on the nanophosphor sheet.

The base layer may be formed of at least one of a silicon resin and a urethane resin.

Yet another exemplary embodiment of the present invention provides a backlight device including: a light source emitting light, a light guide plate receiving and guiding the light, and a plurality of core-shell phosphors positioned to receive the light and convert the light to white light.

The core-shell phosphors may be included in the light guide plate.

The backlight device may include: a coating layer surrounding at least one core-shell phosphor among the plurality of core-shell phosphors.

The coating layer may surround two or more core-shell phosphor groups among the plurality of core-shell phosphors.

The coating layer may include at least one of silica, polystyrene, and urethane.

The core-shell phosphor may be formed of any one of CdSe/ZnS, InP/ZnS, ZnS:Mn/ZnS, PbSe/PbS, CdSe/CdS, CdTe/CdS, and CdTe/ZnS.

Still another exemplary embodiment of the present invention provides a backlight device including: a plurality of light sources generating light, a light guide plate guiding the light, an optical mixing member positioned between the light guide plate and the plurality of light sources, and an adhesive layer attaching the optical mixing member and the light guide plate, wherein the adhesive layer includes a plurality of core-shell phosphors, and light generated in the light source is converted through the adhesive layer into white light.

The backlight device may include: a coating layer surrounding at least one core-shell phosphor among the plurality of core-shell phosphors.

The coating layer may surround two or more core-shell phosphor groups among the plurality of core-shell phosphors.

The coating layer may include at least one of silica, polystyrene, and urethane.

The optical mixing member may be formed in a lenticular form or a prism form on a surface of the light guide plate facing the light source.

Still yet another exemplary embodiment of the present invention provides a backlight device including: a plurality of light sources positioned on a substrate, and a diffuser sheet positioned on the plurality of light sources to be spaced apart from the plurality of light sources, wherein the diffuser sheet includes a plurality of core-shell phosphors, and light generated in the light source is converted through the diffuser sheet into white light.

The backlight device may include: a coating layer surrounding at least one core-shell phosphor among the plurality of core-shell phosphors.

The coating layer may surround two or more core-shell phosphor groups among the plurality of core-shell phosphors.

The coating layer may include at least one of silica, polystyrene, and urethane.

The core-shell phosphor may be formed of any one of CdSe/ZnS, InP/ZnS, ZnS:Mn/ZnS, PbSe/PbS, CdSe/CdS, CdTe/CdS, and CdTe/ZnS.

According to the exemplary embodiments of the present invention, it is possible to prevent degradation by arranging a nanophosphor at a position that is far from a light source and to ensure reliability of a core-shell phosphor by coating the core-shell phosphor.

DETAILED DESCRIPTION OF THE EMBODIMENTS

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 1:
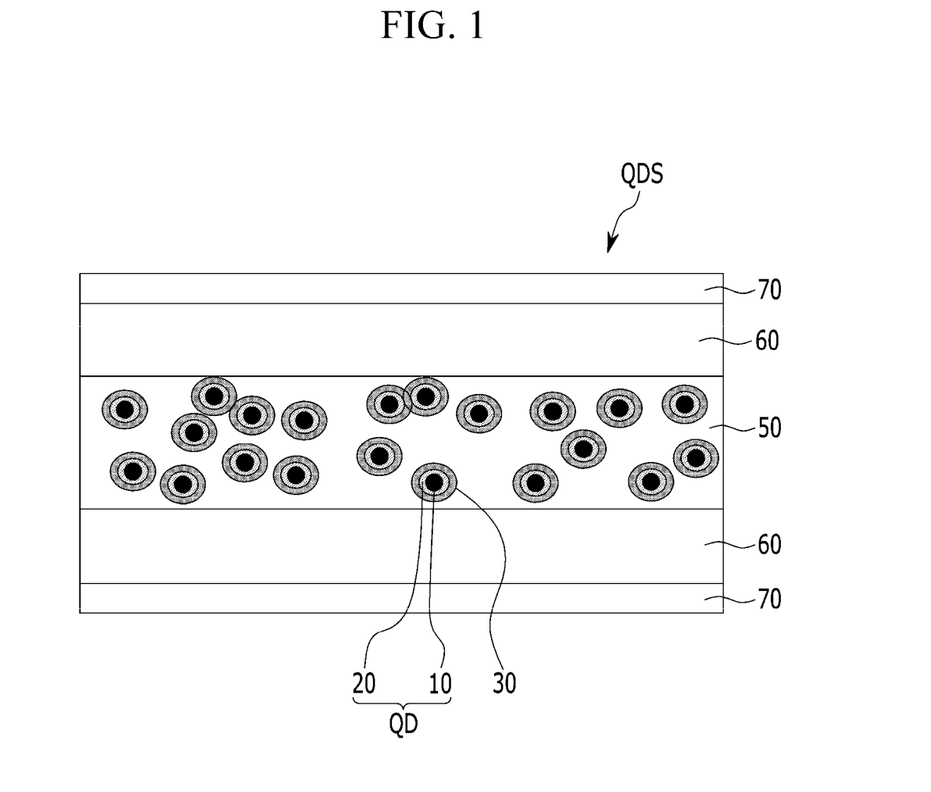
FIG. 1 is a cross-sectional view showing a nanophosphor sheet according to an exemplary embodiment of the present invention.

FIG. 1 is a cross-sectional view showing a nanophosphor sheet according to an exemplary embodiment of the present invention.

Referring to FIG. 1, in the nanophosphor sheet QDS according to the exemplary embodiment of the present invention, a plurality of core-shell phosphors QD are dispersed in a base layer 50. The core-shell phosphor QD is a semiconductor crystal having a nanometer size, a quantum point generating even stronger fluorescence in a narrow wavelength band as compared to a general fluorescent material, and is formed of a core 10 positioned at the center thereof and a shell 20 surrounding the core 10. The core-shell phosphor QD may be any one of CdSe/ZnS, InP/ZnS, ZnS:Mn/ZnS, PbSe/PbS, CdSe/CdS, CdTe/CdS, and CdTe/ZnS.

In the exemplary embodiment, the base layer 50 may be formed of any one of a silicon resin and a urethane resin.

In the exemplary embodiment, the core-shell phosphor QD may be coated with a coating layer 30 that includes silica, polystyrene, urethane, or the like to. The coating layer 30 may provide a barrier characteristic to the core-shell phosphor QD, which is weak to heat and moisture by itself, to increase reliability.

Substrate members 60 are positioned on both surfaces of the base layer 50. The substrate member 60 may be formed of at least one of a polyethylene terephthalate film (PET film), and a copolymer of polycarbonate (PC) and polyethylene terephthalate (CoPET). The substrate member 60 acts as a support substrate for forming the base layer 50. In FIG. 1, the substrate members 60 are formed on both surfaces of the base layer 50, but the substrate member 60 may be formed only on any one surface thereof.

A matte layer 70 that is subjected to matte treatment is positioned on both surfaces of the substrate member 60. The matte layer 70 serves to prevent friction between the nanophosphor sheet according to the exemplary embodiment and a member on which the nanophosphor sheet is positioned and occurrence of a wet-out phenomenon such as a wave pattern. The matte layer 70 may include a texture, e.g. protrusions and depressions, on one or more of its surfaces. Since the surface texture often alters the direction in which incident light propagates, it is preferable to minimize the number of protrusions and depressions.

Figure 2:
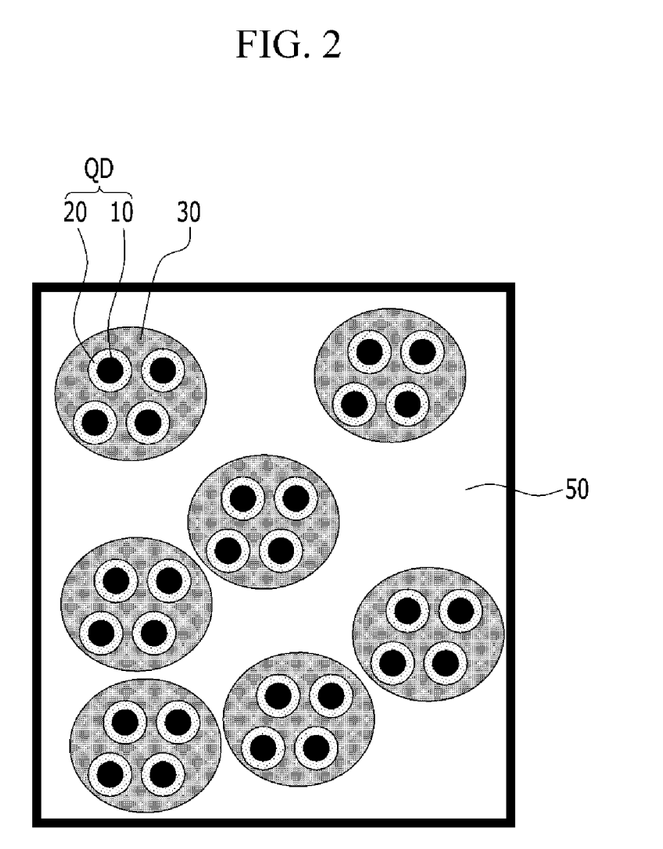
FIG. 2 is a cross-sectional view showing a core-shell phosphor structure according to an exemplary embodiment of the present invention.

FIG. 2 is a cross-sectional view showing a core-shell phosphor structure according to the exemplary embodiment of the present invention.

Referring to FIG. 2, the exemplary embodiment of FIG. 1 is modified in the exemplary embodiment, and one coating layer 30 surrounds a plurality of core-shell phosphors QD. The coating of a plurality of core-shell phosphors QD like the exemplary embodiment may increase a coating efficiency as compared to the coating of the individual core-shell phosphor QD like the exemplary embodiment of FIG. 1.

Figure 3:
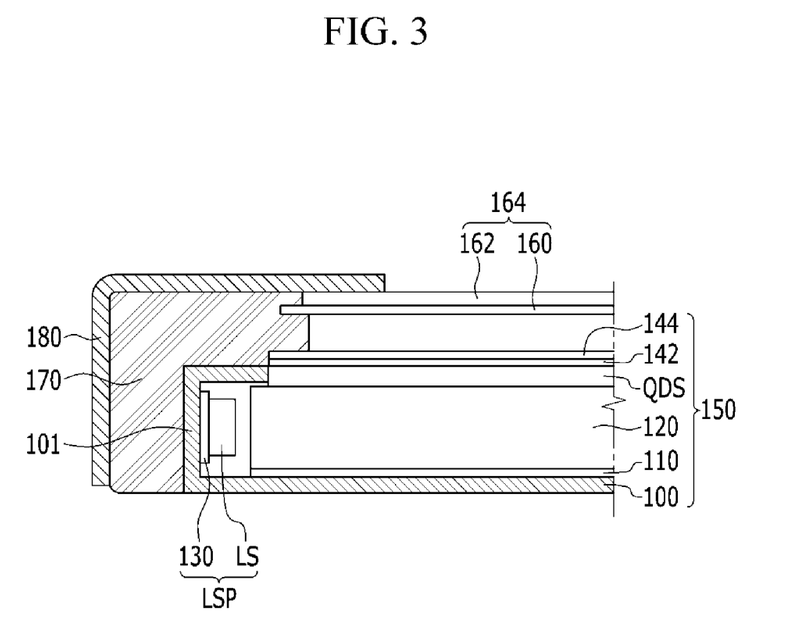
FIG. 3 is a cross-sectional view showing a display device including a backlight device according to an exemplary embodiment of the present invention.

FIG. 3 is a cross-sectional view showing a display device including a backlight device according to the exemplary embodiment of the present invention.

Referring to FIG. 3, the display device according to the exemplary embodiment of the present invention may include a display panel 164 implementing an image, a backlight device 150 providing light to the display panel 164, and an upper cover 180 and a lower cover 100 for receiving the display panel 164 and the backlight device 150.

The upper cover 180 is bent to surround a non-display region of the display panel 164 and a lateral surface of the lower cover 100. A mold frame 170 for supporting other constituent elements is formed between the upper cover 180 and the lower cover 100.

The display panel 164 displays an image by adjusting light transmittance from the backlight device 150 according to an image signal, the display device according to the exemplary embodiment may be a liquid crystal display, and in the case of the liquid crystal display, the display panel 164 may include a liquid crystal layer (not shown) formed between the lower substrate 160 and the upper substrate 162, and a spacer (not shown) maintaining a substantially constant separation distance between the lower substrate 160 and the upper substrate 162.

The upper substrate 162 includes a color filter, a black matrix, a common electrode, and the like.

The lower substrate 160 may include a thin film transistor and a pixel electrode connected to the thin film transistor. Herein, the common electrode constituted on the upper substrate 162 may be formed on the lower substrate 160 according to the type of liquid crystal, and the color filter or black matrix formed on the upper substrate 162 may be formed on the lower substrate 160 to improve an opening ratio.

The backlight device 150 includes a light guide plate 120 changing light emitted from the light source LS into a planar light source to provide the planar light source to the display panel 164 of the upper portion, a diffuser sheet 142 positioned on the upper portion of the light guide plate 120 to scatter light emitted from the light guide plate 120 so that uniform light is emitted, a reflective sheet 110 positioned on the lower portion of the light guide plate 120 to reflect light leaked to an opposite side of the display panel 164, thus transferring light to the light guide plate 120, and a prism sheet 144 positioned on the diffuser sheet 142 to concentrate light diffused in the diffuser sheet 142.

In the exemplary embodiment, the nanophosphor sheet QDS is formed on the light guide plate 120. The nanophosphor sheet QDS may be the nanophosphor sheet QDS described in FIG. 1. Further, as shown in FIG. 2, the coating layer 30 may be formed to surround a plurality of core-shell phosphors. In this case, light generated by the light source LS reaches the nanophosphor sheet QDS after propagating through the light guide plate 120, and this light may be converted into white light while passing through the nanophosphor sheet QDS. The light source LS may emit blue light. In this case, the particle size and concentration of the nanophosphor may be controlled to achieve a desired color and color coordinate by mixing the nanophosphor sheet QDS with blue light.

The diffuser sheet 142 and the prism sheet 144 may be designed optimized to white light, and if light displaying a color other than white light is used as the light source LS, it is preferable that the nanophosphor sheet QDS according to the exemplary embodiment be positioned directly on the light guide plate 120 in view of maintenance of light uniformity.

In the exemplary embodiment, the light source LS is mounted on a printed circuit board PCB 130. The light source LS may receive a power source and an electric signal through the printed circuit board PCB 130, and the light source portion LSP including the light source LS and the printed circuit board PCB 130 may be disposed at a position adjacent to an edge of one side of the light guide plate 120 along the edge of one side of the light guide plate 120. Herein, the light source LS may be a light emitting diode (LED). FIG. 3 shows that the light source portion LSP has a top view type structure, but the light source portion LSP may emit light in a side view type.

The lower cover 100 includes a lateral surface cover 101 having a "[" shape at the edge thereof, and the lateral surface cover 101 may prevent light leakage by covering the surfaces other than the surface facing the light guide plate 120 of the light source LS.

Figure 4:
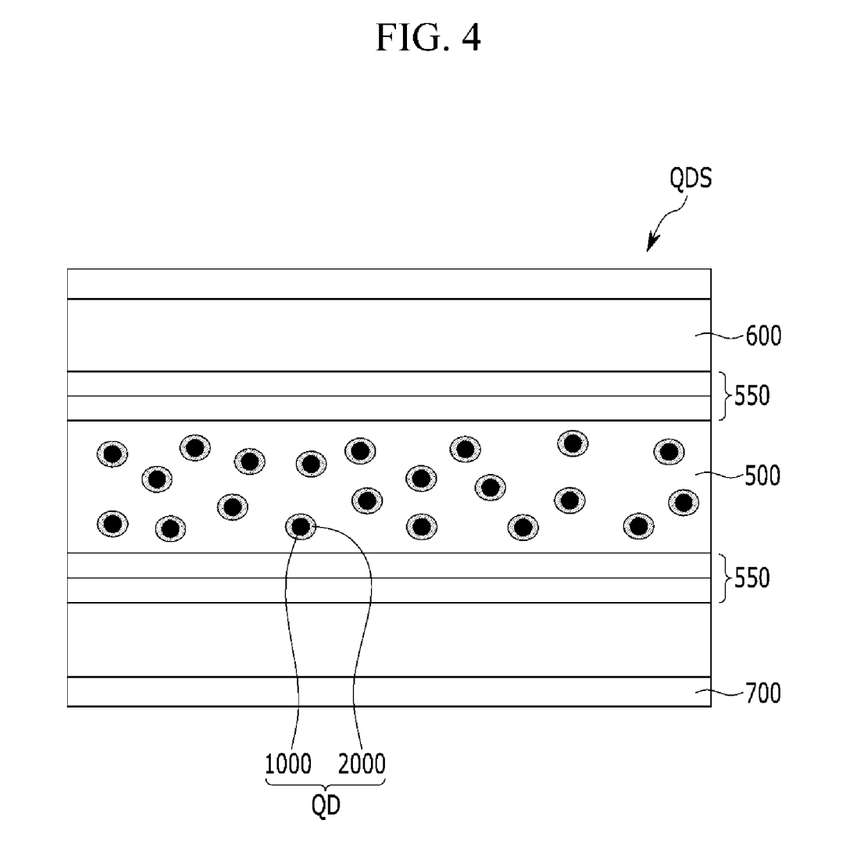
FIG. 4 is a cross-sectional view showing the nanophosphor sheet according to an exemplary embodiment of the present invention in FIG. 3.

FIG. 4 is a cross-sectional view showing the nanophosphor sheet according to another exemplary embodiment of the present invention in FIG. 3.

As described above, in the nanophosphor sheet QDS, the core-shell phosphor may gain a barrier characteristic by being coated with the coating layer 30, without relying on a separate barrier layer. In the modified embodiment of FIG. 4, however, barrier layers 550 may be formed on both surfaces of the base layer 500 without the coating layer 30. In the embodiment of FIG. 4, a silicon resin or a urethane resin may fill the space between the core-shell phosphors QD FIG. 5 is a cross-sectional view showing the display device including the backlight device according to an exemplary embodiment of the present invention.

Figure 5:
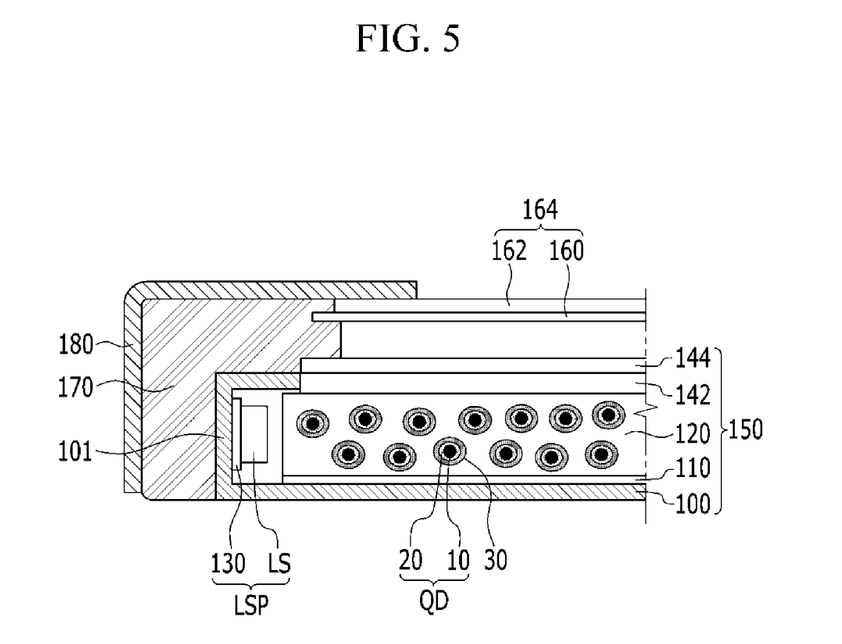
FIG. 5 is a cross-sectional view showing the display device including the backlight device according to an exemplary embodiment of the present invention.

The exemplary embodiment described in FIG. 5 has a constitution that is mostly similar to that of the exemplary embodiment described in FIG. 3. The description below will focus on the differences between the embodiment of FIG. 3 and the embodiment of FIG. 5, to avoid redundant description of the elements that are substantially similar.

Referring to FIG. 5, the light guide plate 120 includes a plurality of core-shell phosphors QD, and a plurality of core-shell phosphors QD may be formed by being dispersed in an injection molding matter when the light guide plate 120 is injected and molded. In the exemplary embodiment, the core-shell phosphor QD may be coated with the coating layer 30 that may include silica, polystyrene, urethane, or the like. In this case, the coating layer 30 may be formed to surround at least one core-shell phosphor QD among a plurality of core-shell phosphors QD.

In the exemplary embodiment, since the core-shell phosphor QD is dispersed in the light guide plate 120, the separate nanophosphor sheet is not formed like in the exemplary embodiment of FIG. 3. Further, the light source LS may emit blue light instead of white light, and light generated in the light source LS may be converted into white light while passing through the light guide plate 120. The white light may reach the display panel 164 via the diffuser sheet 142 and the prism sheet 144.

Figure 6:
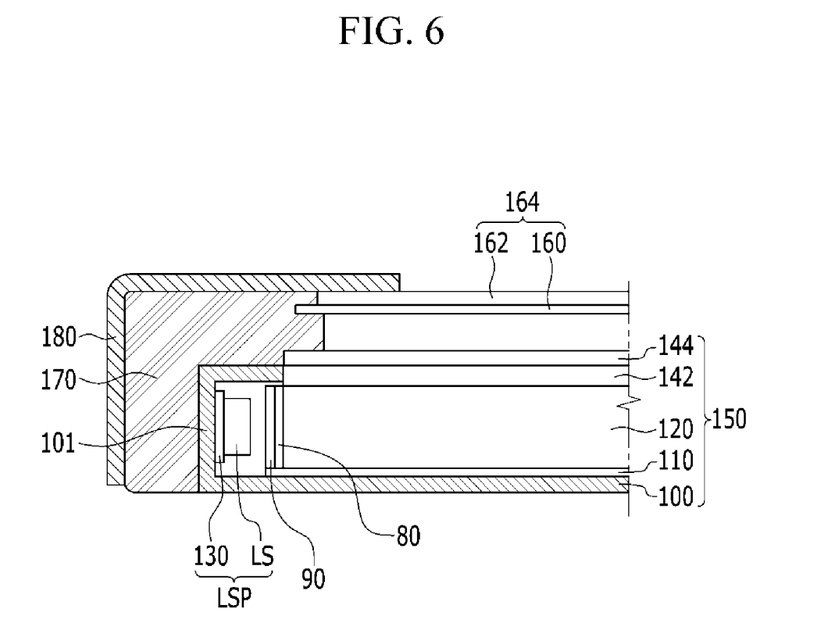
FIG. 6 is a cross-sectional view showing the display device including the backlight device according to an exemplary embodiment of the present invention.
Figure 7:
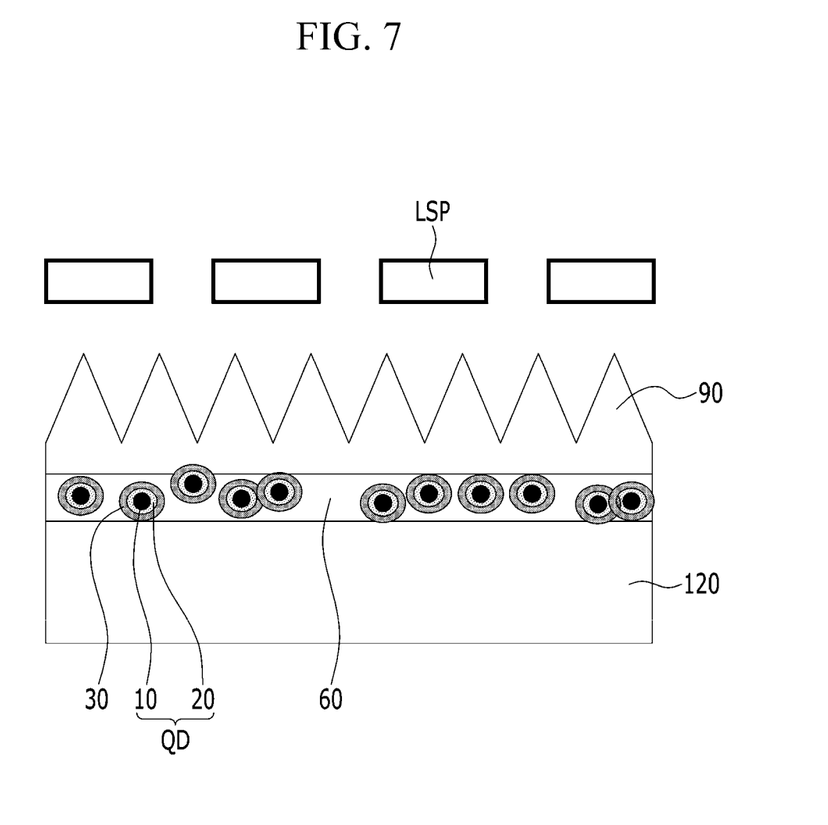
FIG. 7 is a layout view showing a constituent element between a light source portion and a light guide plate in FIG. 6.

FIG. 6 is a cross-sectional view showing the display device including the backlight device according to the exemplary embodiment of the present invention, and FIG. 7 is a layout view showing a constituent element between a light source portion and a light guide plate in FIG. 6.

The exemplary embodiment described in FIGS. 6 and 7 has a constitution that is mostly similar to that of the exemplary embodiment described in FIG. 5. The description below will focus on the differences between the embodiment of FIGS. 6 and 7 and the embodiment of FIG. 5.

Referring to FIGS. 6 and 7, an optical mixing member 90 is positioned between a plurality of light source portions LSP and the light guide plate 120. The optical mixing member 90 may serve to perform optical mixing to convert blue light into white light when the light source LS emits blue light, and may serve to prevent a hot spot. The generation of hot spot is avoided by controlling the distance between the light sources LS included in the light source portion LSP, thereby reducing a difference in intensity of light between a bright portion by bending light through the shape (ex. a prism shape) of the optical mixing member 90 and a dark portion.

The optical mixing member 90 may be attached to the lateral surface of the light guide plate 120 by an adhesive layer 80. In this case, in the exemplary embodiment, the adhesive layer 80 includes a plurality of core-shell phosphors QD, and the adhesive layer 80 including a plurality of core-shell phosphors QD may be formed by mixing the adhesive material forming the adhesive layer 80 and the core-shell phosphors QD. In the exemplary embodiment, the core-shell phosphor QD is coated with a coating layer 30 that may include silica, polystyrene, urethane, or the like. In this case, the coating layer 30 may be formed to surround at least one core-shell phosphor QD among a plurality of core-shell phosphors QD.

In the exemplary embodiment, since the core-shell phosphor QD is dispersed in the adhesive layer 80, the separate nanophosphor sheet is not formed like in the exemplary embodiment of FIG. 3. Further, the light source LS may emit blue light instead of white light, and light generated by the light source LS may be converted through the adhesive layer 80 into white light. Light converted into white light may reach the display panel 154 via the light guide plate 120.

In the exemplary embodiment, the optical mixing member 90 is formed in a lenticular form or a prism form on the surface facing the light source LS. Herein, the form is not limited to the lenticular form or the prism form, and a modification is feasible as long as the form can scatter light generated in the light source LS.

Figure 8:
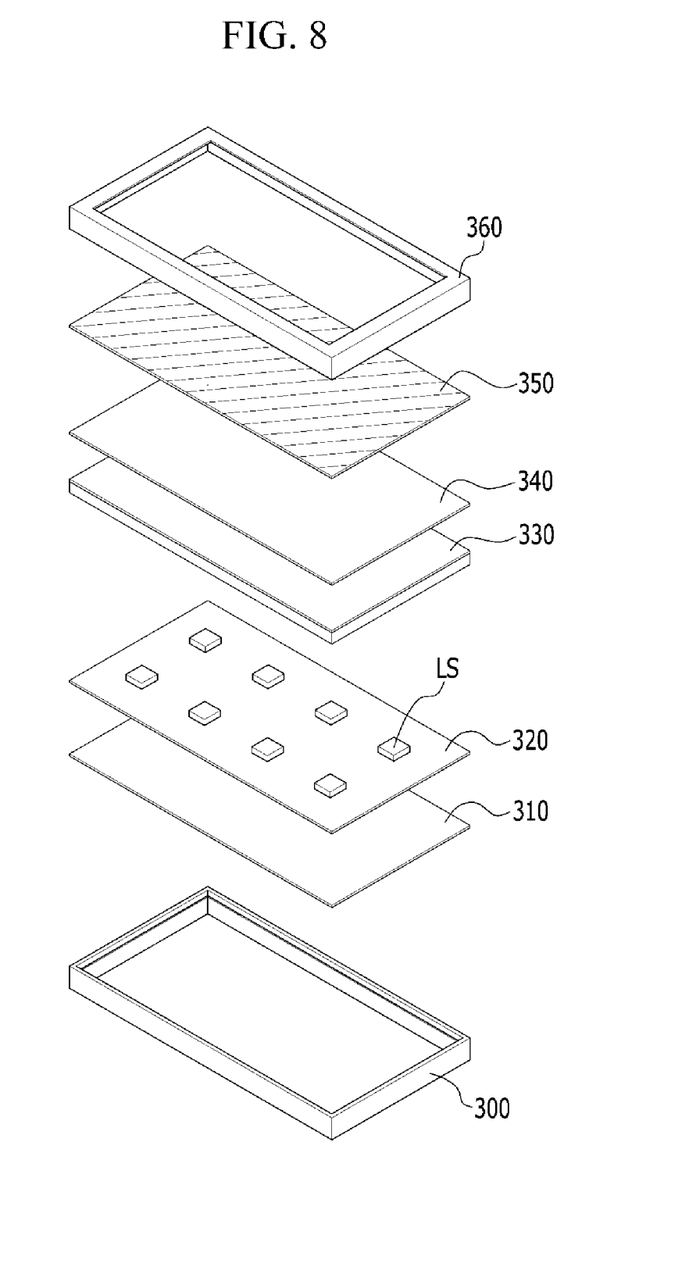
FIG. 8 is a cross-sectional view showing the display device including the backlight device according to an exemplary embodiment of the present invention.

FIG. 8 is a cross-sectional view showing the display device including the backlight device according to the exemplary embodiment of the present invention.

Referring to FIG. 8, the device includes a lower cover 300, a reflective sheet 310, a substrate 320 including the light source LS, an optical film including a diffuser sheet 330 and a prism sheet 340, a display panel 350, and an upper cover 360. Herein, the substrate 320 may be a circuit board that may transfer power and electric signals to the light source LS.

The lower cover 300 may receive the light source in a box form having an open upper surface. The upper cover 360 may be assembled and fixed to the lower cover 300 to surround the edge of the optical film including the diffuser sheet 330 and the prism sheet 340.

The diffuser sheet 330 may scatter light emitted from the light source LS to make light uniform over the entire panel, and the prism sheet 340 may concentrate light scattered by the diffuser sheet 330 to increase luminance. Although not shown in the drawings, a protecting sheet for protecting the prism sheet 340 may be further formed on the prism sheet 340.

In the exemplary embodiment, the diffuser sheet 330 includes a plurality of core-shell phosphors, and the diffuser sheet 330 including a plurality of core-shell phosphors may be formed by mixing the diffuser sheet material forming the diffuser sheet 330 and the core-shell phosphors QD.

In the exemplary embodiment, the core-shell phosphor is coated with a coating layer 30 that may include silica, polystyrene, urethane, or the like. In this case, the coating layer may be formed to surround at least one core-shell phosphor among a plurality of core-shell phosphors.

The light source LS may emit blue light instead of white light, and light generated in the light source LS may be converted through the diffuser sheet 330 into white light. Light converted into white light may reach the display panel 350 via the prism sheet 340 as described below.

The display panel 350 may be further provided between the optical film including the diffuser sheet 330 and the prism sheet 340 and the upper cover 360, and the display panel 350 may be a liquid crystal panel. The liquid crystal panel 350 may include a pair of lower substrate (not shown) and upper substrate (not shown) facing each other with the liquid crystal layer interposed therebetween.

The upper substrate includes a color filter, a black matrix, a common electrode, and the like.

The lower substrate may include a thin film transistor and a pixel electrode connected to the thin film transistor. Herein, the common electrode constituted on the upper substrate may be formed on the lower substrate according to a mode of liquid crystal, and the color filter or the black matrix formed on the upper substrate may be formed on the lower substrate to improve an opening ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| 30 | Coating layer | 50 | Base layer |
| 60 | Substrate member | 70 | Matte layer |
| 80 | Adhesive layer | 90 | Optical mixing member |
| 120 | Light guide plate | QD | Core-shell phosphor |

What is claimed is:

1. A nanophosphor sheet comprising:
a base layer,
core-shell phosphors surrounded by a coating layer to form coated core-shell phosphors that are dispersed in the base layer, wherein each of the coated core-shell phosphors include more than one core-shell phosphors.

2. A nanophosphor sheet comprising:
a base layer,
a core-shell phosphor dispersed in the base layer,
a coating layer surrounding the core-shell phosphors, wherein the coating layer includes at least one of silica, polystyrene, and urethane,
a substrate member on at least one surface of both surfaces of the base layer, wherein the substrate member includes at least one of a polyethylene terephthalate film (PET film), a copolymer of polycarbonate (PC) and polyethylene terephthalate (CoPET), and a matte layer that is subjected to matte treatment on the substrate member.

3. The nanophosphor sheet of claim 2, wherein:
the core-shell phosphor is formed of at least one of CdSe/ZnS, InP/ZnS, ZnS:Mn/ZnS, PbSe/PbS, CdSe/CdS, CdTe/CdS, and CdTe/ZnS.

4. The nanophosphor sheet of claim 2, wherein:
the base layer is formed of at least one of a silicon resin and a urethane resin.

5. A backlight device comprising:
a light source emitting light,
a light guide plate receiving and guiding the light,
a display panel on the light guide plate, and
a nanophosphor sheet between the light guide plate and the display panel, wherein the nanophosphor sheet includes:
a base layer, and
a plurality of core-shell phosphors dispersed in the base layer.

6. The backlight device of claim 5, further comprising a coating layer surrounding at least one core-shell phosphor among the plurality of core-shell phosphors.

7. The backlight device of claim 6, wherein:
the coating layer surrounds two or more core-shell phosphor groups among the plurality of core-shell phosphors.

8. The backlight device of claim 7, wherein:
the coating layer includes at least one of silica, polystyrene, and urethane.

9. The backlight device of claim 8, further comprising:
a substrate member on at least one surface of both surfaces of the base layer,
wherein the substrate member includes at least one of a polyethylene terephthalate film (PET film), and a copolymer of polycarbonate (PC) and polyethylene terephthalate (CoPET).

10. The backlight device of claim 9, further comprising:
a matte layer that is subjected to matte treatment on the substrate member.

11. The backlight device of claim 5, further comprising:
barrier layers positioned on both surfaces of the base layer.

12. The backlight device of claim 11, wherein:
the barrier layer is formed of a metal material including at least one of silicon oxide or aluminum and silver.

13. The backlight device of claim 12, further comprising:
a substrate member on at least one surface of both surfaces of the base layer,
wherein the substrate member includes at least one of a polyethylene terephthalate film (PET film), and a copolymer of polycarbonate (PC) and polyethylene terephthalate (CoPET).

14. The backlight device of claim 13, further comprising:
a matte layer that is subjected to matte treatment on the substrate member.

15. The backlight device of claim 5, wherein:
the core-shell phosphor is formed of any one of CdSe/ZnS, InP/ZnS, ZnS:Mn/ZnS, PbSe/PbS, CdSe/CdS, CdTe/CdS, and CdTe/ZnS.

16. The backlight device of claim 5, further comprising:
an optical film including a diffuser sheet positioned on the nanophosphor sheet.

17. The backlight device of claim 5, wherein:
the base layer is formed of at least one of a silicon resin and a urethane resin.

18. A backlight device comprising:
a light source emitting light, and
a light guide plate receiving and guiding the light, wherein the light guide plate includes a plurality of core-shell phosphors dispersed throughout the light guide plate and positioned to receive the light and convert the light to white light.

19. The backlight device of claim 18, further comprising:
a coating layer surrounding at least one core-shell phosphor among the plurality of core-shell phosphors.

20. The backlight device of claim 19, wherein:
the coating layer surrounds two or more core-shell phosphor groups among the plurality of core-shell phosphors.

21. The backlight device of claim 19, wherein:
the coating layer includes at least one of silica, polystyrene, and urethane.

22. The backlight device of claim 18, wherein:
the core-shell phosphor is formed of any one of CdSe/ZnS, InP/ZnS, ZnS:Mn/ZnS, PbSe/PbS, CdSe/CdS, CdTe/CdS, and CdTe/ZnS.

23. A backlight device comprising:
a plurality of light sources generating light,
a light guide plate guiding the light,
an optical mixing member positioned between the light guide plate and the plurality of light sources, and
an adhesive layer attaching the optical mixing member and the light guide plate,
wherein the adhesive layer includes a plurality of core-shell phosphors, and light generated in the light source is converted through the adhesive layer into white light.

24. The backlight device of claim 23, further comprising:
a coating layer surrounding at least one core-shell phosphor among the plurality of core-shell phosphors.

25. The backlight device of claim 24, wherein:
the coating layer surrounds two or more core-shell phosphor groups among the plurality of core-shell phosphors.

26. The backlight device of claim 24, wherein:
the coating layer includes at least one of silica, polystyrene, and urethane.

27. The backlight device of claim 23, wherein:
the optical mixing member is formed in a lenticular form or a prism form on a surface of the light guide plate facing the light source.

28. A backlight device comprising:
a plurality of light sources positioned on a substrate,
a display panel on the plurality of light sources, and
a diffuser sheet positioned between the plurality of light sources and the display panel to scatter the light from the light sources, wherein the diffuser sheet includes a plurality of core-shell phosphors, and light generated in the light source is converted through the diffuser sheet into white light.

29. The backlight device of claim 28, further comprising:
a coating layer surrounding at least one core-shell phosphor among the plurality of core-shell phosphors.

30. The backlight device of claim 29, wherein:
the coating layer surrounds two or more core-shell phosphor groups among the plurality of core-shell phosphors.

31. The backlight device of claim 30, wherein:
the coating layer includes at least one of silica, polystyrene, and urethane.

32. The backlight device of claim 28, wherein:
the core-shell phosphor is formed of any one of CdSe/ZnS, InP/ZnS, ZnS:Mn/ZnS, PbSe/PbS, CdSe/CdS, CdTe/CdS, and CdTe/ZnS.

* * * * *